(12) United States Patent
Williams et al.

(10) Patent No.: US 10,442,370 B2
(45) Date of Patent: Oct. 15, 2019

(54) TRUCK DECK RAIL TOOL STORAGE AND TRUCK DECK AND TRUCK HAVING THE SAME

(71) Applicant: Toyota Motor Engineering & Manufacturing North America, Inc., Erlanger, KY (US)

(72) Inventors: Paxton S. Williams, Milan, MI (US); Scott L. Frederick, Brighton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 28 days.

(21) Appl. No.: 15/874,974

(22) Filed: Jan. 19, 2018

(65) Prior Publication Data

US 2019/0225166 A1    Jul. 25, 2019

(51) Int. Cl.
| | |
|---|---|
| *B62D 33/02* | (2006.01) |
| *B60R 11/06* | (2006.01) |
| *B62D 33/023* | (2006.01) |
| *B60R 11/00* | (2006.01) |

(52) U.S. Cl.
CPC .......... *B60R 11/06* (2013.01); *B62D 33/023* (2013.01); *B60R 2011/0019* (2013.01); *B60R 2011/0036* (2013.01); *B60R 2011/0071* (2013.01); *B60R 2011/0075* (2013.01); *B60R 2011/0094* (2013.01)

(58) Field of Classification Search
CPC ............ B60R 11/06; B60R 2011/0019; B60R 2011/0036; B60R 2011/0071; B60R 2011/0075; B60R 2011/0094; B62D 33/023

See application file for complete search history.

(56) References Cited

U.S. PATENT DOCUMENTS

| | | | | |
|---|---|---|---|---|
| 3,393,920 | A | * | 7/1968 | Ehrlich ................ B62D 33/048 280/423.1 |
| 4,067,601 | A | * | 1/1978 | Tuerk ................. B62D 33/0207 105/380 |
| 5,299,849 | A | * | 4/1994 | Cook ....................... B60J 7/104 135/88.09 |

(Continued)

OTHER PUBLICATIONS

U.S. Appl. No. 10/124,837, filed Nov. 2018, Reiners; Robert.*

*Primary Examiner* — Lori L Lyjak
(74) *Attorney, Agent, or Firm* — Christopher G. Darrow; Darrow Mustafa PC

(57) ABSTRACT

A truck box or rear compartment includes a deck. The deck includes a floor that defines a cargo area having a length and width. The deck also includes a pair of opposed inner sidewalls that extend along the length of the cargo area comprising a first inner sidewall portion that extends upwardly away from the floor to a top portion and a second inner sidewall portion that extends downwardly from the top portion to a lower end, the lower end comprising a pocket channel. A pickup truck box deck rail assembly includes a deck rail configured for disposition on a top portion of an outer sidewall of a pickup truck box, the deck rail comprising a plurality of deck rail openings. The assembly also includes a corresponding plurality of opening covers configured to selectively and releasably cover and uncover the deck rail openings.

19 Claims, 5 Drawing Sheets

(56) References Cited

U.S. PATENT DOCUMENTS

| | | | | |
|---|---|---|---|---|
| 5,720,507 | A | * | 2/1998 | Emery .................... B60R 13/01 296/39.2 |
| 5,823,601 | A | | 10/1998 | Stanesic et al. |
| 6,286,884 | B1 | * | 9/2001 | Speece .................... B60R 13/01 280/770 |
| 6,644,901 | B2 | * | 11/2003 | Breckel ................. B60P 7/0815 410/104 |
| 6,669,269 | B1 | * | 12/2003 | Tran-Ngoc .............. B60P 3/341 296/156 |
| 2001/0032410 | A1 | | 10/2001 | Hayes |
| 2007/0031226 | A1 | * | 2/2007 | Hynes ...................... B60P 1/00 414/482 |
| 2013/0075436 | A1 | * | 3/2013 | Martin ..................... B60R 9/00 224/403 |
| 2014/0375077 | A1 | * | 12/2014 | Schmeichel ............. B60P 7/04 296/100.16 |
| 2018/0334195 | A1 | * | 11/2018 | Stojkovic ........... B62D 25/2072 |

* cited by examiner

US 10,442,370 B2

TRUCK DECK RAIL TOOL STORAGE AND TRUCK DECK AND TRUCK HAVING THE SAME

FIELD OF THE INVENTION

The embodiments described herein generally relate to a truck deck rail tool storage apparatus, and more particularly to an apparatus that includes a truck deck rail, truck deck, and/or truck configured for truck deck rail tool storage.

BACKGROUND

Light duty trucks known as pickup trucks that include a passenger compartment (frequently called the "cab") and a rear compartment that includes a cargo area (frequently called the "box") are widely used both by consumers and by businesses in a multitude of commercial applications because of their versatility to provide simultaneous transportation of passengers in the cab and transportation of payloads in the rear compartment. The payloads transported can include tools, materials and/or equipment. Tools may include all manner of landscaping tools that generally include extended handles for operation and manipulation by a human user such as shovels, rakes, and brooms.

SUMMARY OF THE INVENTION

Disclosed herein are embodiments for holding tools (e.g., shovels, rakes, brooms) in the box of a truck, such as a pickup truck. In one embodiment, a box of a truck compartment is disclosed. The box of the truck includes a deck. The deck includes a floor that defines a cargo area having a length and width. The deck also includes a pair of opposed inner sidewalls that extend along the length of the cargo area comprising a first inner sidewall portion that extends upwardly away from the floor to a top portion and a second inner sidewall portion that extends downwardly from the top portion to a lower end, the lower end comprising a pocket channel. In a further embodiment, the box of the truck may also include a pair of opposed outer sidewalls that extend along the length of the cargo area, each of the outer sidewalls comprising a top portion and outer sidewall portion that extends downwardly from the top portion of the outer sidewall, and a pair of opposed deck rails disposed on the top portion of the outer sidewalls, each deck rail comprising an opening.

In another embodiment, a pickup truck box deck rail assembly is disclosed. The pickup truck box deck rail assembly includes a deck rail configured for disposition on a top portion of an outer sidewall of a pickup truck box, the deck rail comprising a plurality of deck rail openings. The pickup truck box deck rail assembly also includes a corresponding plurality of deck rail opening covers configured to selectively and releasably cover and uncover the deck rail openings.

In yet another embodiment, a truck such as a pickup truck is disclosed. The truck includes an enclosed passenger compartment. The truck also includes a rear compartment or box. The rear compartment or box includes a floor that defines a cargo area having a length and width. The rear compartment or box also includes a pair of opposed inner sidewalls that extend along the length of the cargo area comprising a first inner sidewall portion that extends upwardly away from the floor to a top portion and a second inner sidewall portion that extends downwardly from the top portion to a lower end, the lower end comprising a pocket channel, wherein the second inner sidewall portion extends downwardly at an angle away from a vertical axis. The rear compartment or box further includes a pair of opposed outer sidewalls that extend along the length of the cargo area, each of the outer sidewalls comprising a top portion and outer sidewall portion that extends downwardly from the top portion of the outer sidewall. The rear compartment or box also includes a pair of opposed deck rails disposed on the top portion of the outer sidewalls, each deck rail comprising a deck rail opening.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
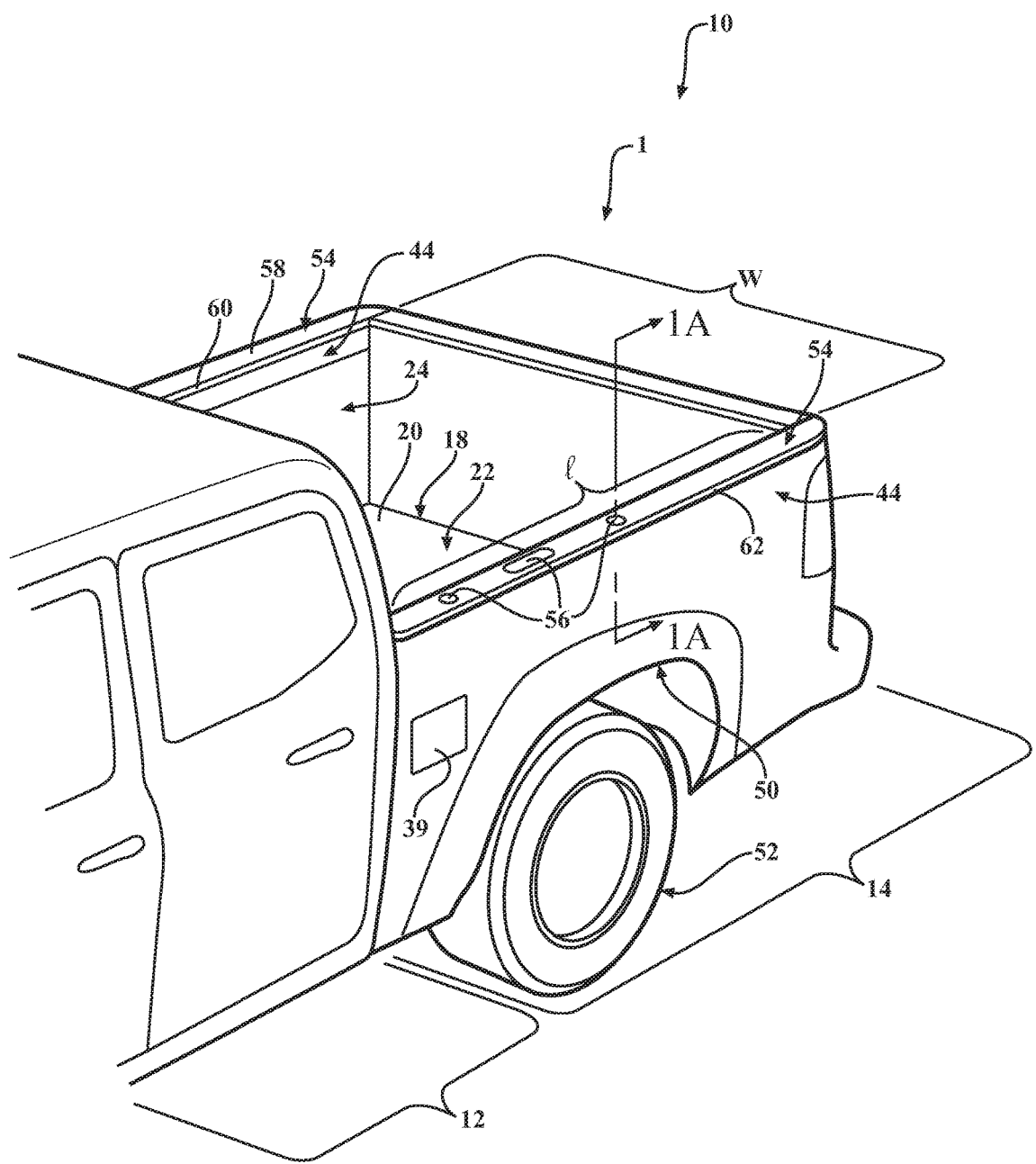
FIG. 1 is a perspective view of an exemplary embodiment of a truck deck rail tool storage apparatus as disclosed herein comprising a truck rear compartment deck rail and rear compartment, as well as a truck embodying the same.

A truck deck rail tool storage apparatus is disclosed. The apparatus is applicable to light duty trucks known as pickup trucks that have an enclosed cab and a rear compartment or box comprising an open cargo area or bed with a deck having relatively low sides and a tailgate. The truck deck rail tool storage apparatus may include a pair of longitudinally extending deck rails or sidewall covers that are disposed on the sidewalls of the truck box. The deck rails include a plurality of openings that open into corresponding openings in the corresponding ones of a pair of opposed longitudinally extending outer sidewalls of the box. The deck of the box includes opposed longitudinally extending inner sidewalls that are each joined to the floor. These inner sidewalls each include a first inner sidewall portion that faces toward the cargo area and a second sidewall portion that faces outwardly toward a respective outer sidewall of the box. These inner sidewall portions taper at an angle from the vertical outwardly away from the cargo area and downwardly from a top of the inner sidewall away the first sidewall portion and toward the respective outer sidewall to a lower end that includes a pocket channel, which may have a substantially U-shaped cross section. The openings in the deck rail and/or outer sidewall are configured to receive a free end of tools having an extended handle or other elongated components or materials as they are inserted into the apparatus for engagement with the pocket channel. In order to bear the weight of the tools, increase the stiffness, and reduce the flexure of the inner sidewall in use, the inner sidewalls may include one or more laterally extending sidewall reinforcing ribs that extend between the first inner sidewall portion and the second inner sidewall portion. In addition, the pocket channels may include one or more laterally extending pocket channel ribs that assist to bear the weight of the tools, increase the stiffness, and reduce the flexure of the pocket channel in use as well as to define a plurality of discrete pockets along the length of the pocket channel that are configured to receive the free ends of the respective tools, components, or materials. The apparatus may also include deck rail opening covers configured to releasably cover and uncover the openings in the deck rails, and these covers may be tethered to the deck rail, outer sidewall or deck by a plurality of cover tethers. Furthermore, the apparatus may also include a one or more anchor points disposed on or in the deck, as well as one or more tool tethers that are configured to tether or fix the tools, components, or materials that are inserted into the apparatus to the apparatus and thereby to the box and vehicle.

The apparatus is advantageously configured to provide for upright storage of tools having an extended member or handle, or other elongated components or materials, within the space between the sidewalls of the rear compartment or box of a pickup truck by insertion through openings in the deck rail and box outer sidewall into a pocket channel formed by a portion of the inner sidewall of the deck of the box. The truck deck rail tool storage apparatus advantageously provides upright storage of the tools at an angle that slopes inwardly into the box over the cargo area. In one embodiment, this slanted or sloped configuration provides that no portion of the tools or other materials inserted into the apparatus extends outside of a vertical plane that extends upwardly around a periphery of the cargo area of the box. Thus, the apparatus provides that all of the stored tools or other materials are located within the vertical space envelope defined by the outer periphery of the vehicle, particularly the outer periphery of the truck box. This is very advantageous because extension outside of the vertically extending volume defined by the periphery of the vehicle, particularly the truck box, permits or allows interaction or collision with other vehicles, buildings, trees, or other objects located in this space, particularly as this space and the associated objects in it changes continuously while the vehicle is in motion. Having the tools or other materials stored securely over the cargo area of the truck box prevents undesirable collision or interaction with external items while also freeing up the cargo area for storage of cargo other than the tools or other elongated materials, such as equipment or other materials, thereby increasing the cargo capacity of the vehicle, which is very desirable.

As used herein, the terms front or forward or rear or rearward refer to the front or rear of the truck, or to a direction toward the front or rear of the truck, respectively. The term longitudinal or along the length refers to a direction that extends along a vehicle centerline between the front and the rear. The term lateral or along the width refers to a direction that is orthogonal, or substantially orthogonal, to the longitudinal direction. The terms up or upward or down or downward refer to the top or bottom of the truck, or to a direction toward the top or bottom of the truck, respectively.

Figure 2:
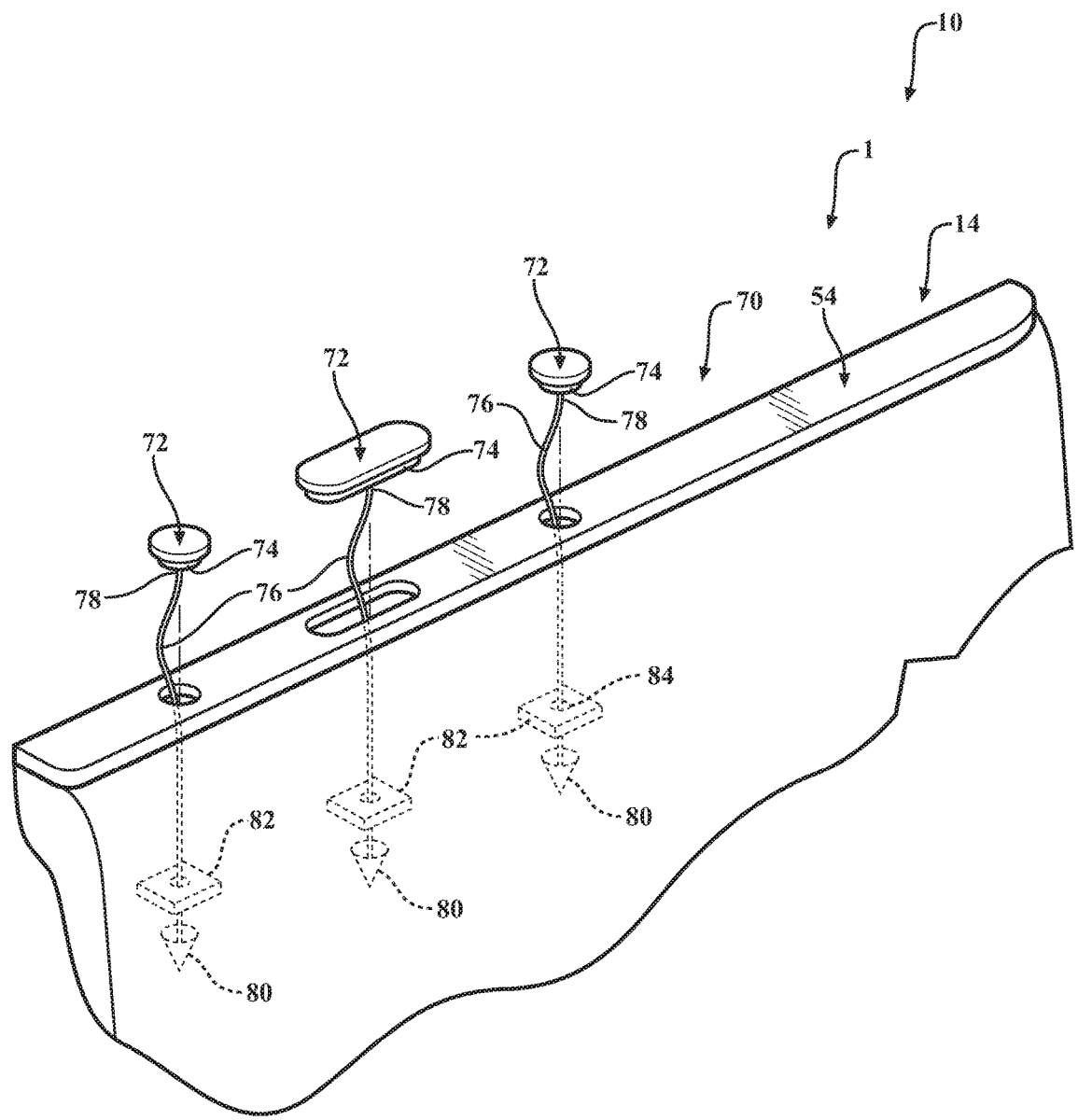
FIG. 2 is an exploded perspective view of an embodiment of a deck rail assembly comprising the deck rail of FIG. 1 and including a deck rail, deck rail openings, deck rail opening covers, and cover tethers as disclosed herein.
Figure 3:
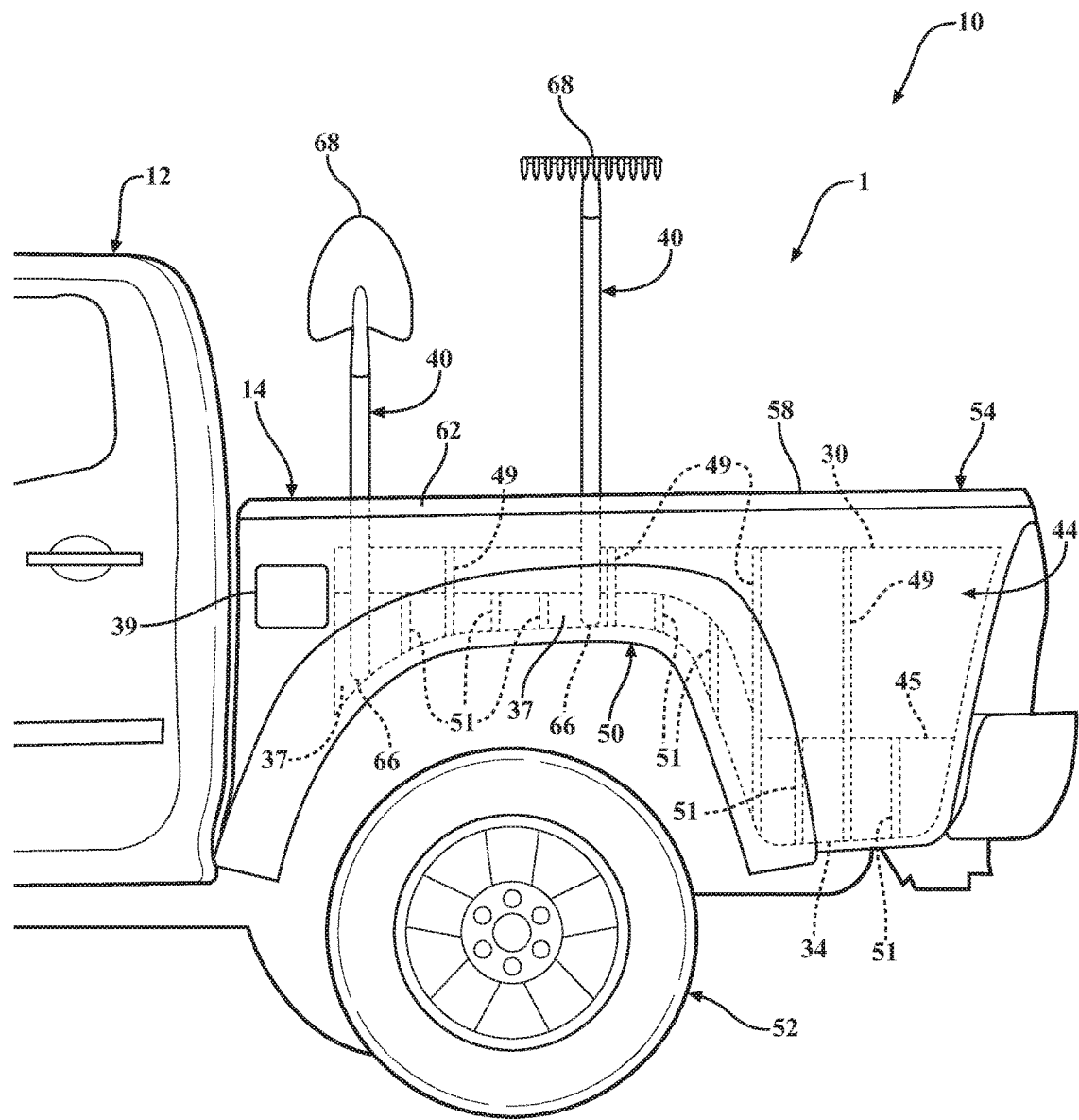
FIG. 3 is a side view of a truck deck rail tool storage apparatus and truck of FIG. 1 illustrating tools stored in the apparatus.

Referring now to the figures, particularly FIGS. 1-3, an embodiment of a truck 10 is disclosed, more particularly, a light duty pickup truck that includes a deck rail storage apparatus 1, such as a deck rail tool storage apparatus. The truck 10 includes all manner of pickup trucks, including those commonly referred to as small, mid, and full-size pickup trucks, such as, for example, trucks generally referred to as half, three quarter, and one-ton pickup trucks. Truck 10 includes an enclosed passenger compartment 12 or cab configured to receive the driver and/or passengers. Truck 10 also includes a substantially open or open rear compartment 14, also referred to as a box or bed, that is configured to receive and transport all manner of cargo.

Figure 1A:
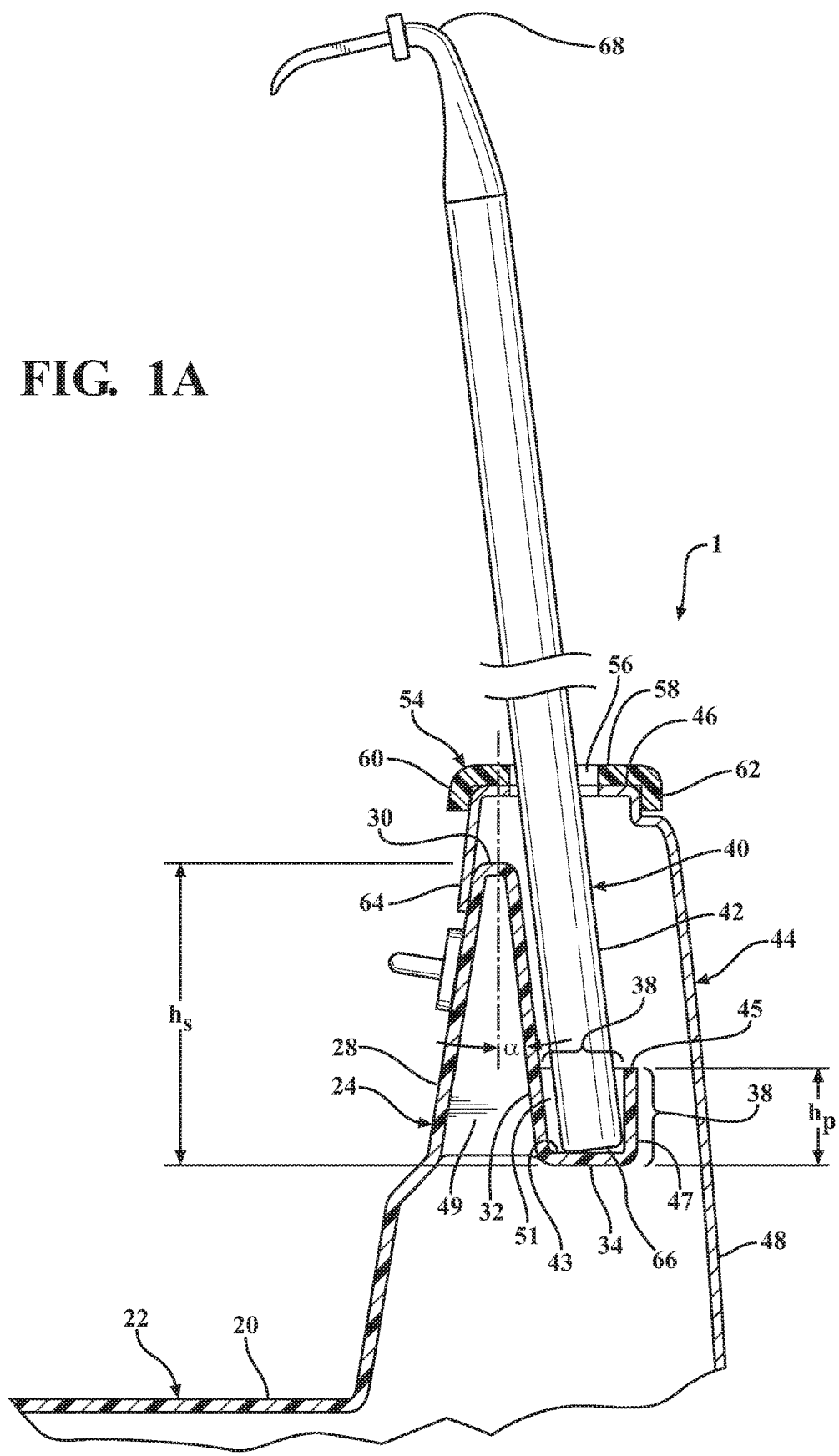
FIG. 1A is a cross-sectional view of Section A-A of FIG. 1 having an embodiment of an elongated member, such as a tool, disposed therein.

In one embodiment, the deck rail storage apparatus 1 comprises the rear compartment 14 or box or bed. The rear compartment 14 includes a deck 18 that is configured to receive the cargo. The deck 18 includes a floor 20 that defines a cargo area 22 having a length (l) and width (w) as shown in FIG. 1. The length and width may be any suitable length and width, including in various embodiments lengths ranging from about 58 to 102 inches, and widths ranging from about 51 to 72 inches. The deck 18 may also have a height that extends vertically from the top surface of the floor 20 to the top surface of the deck rail 54. The height may be any suitable height, including in various embodiments heights ranging from about 18 to 26 inches. The deck 18 also includes a pair of opposed inner sidewalls 24 that extend longitudinally along the length (l) of the cargo area 22. Referring to FIG. 1A, the opposed inner sidewalls 24 each include a first inner sidewall portion 28 that extends upwardly away from the floor 20 to a top portion 30 and a second inner sidewall portion 32 that extends downwardly from the top portion to a lower end 34 that includes a pocket channel 38, and in one embodiment the second inner sidewall portion extends downwardly at a predetermined angle ($\alpha$) away from a vertical axis 36. Any suitable angle may be selected, which in one embodiment may be 2 to 25 degrees, and in another embodiment 5-20 degrees, and in yet another embodiment 5-15 degrees. In one embodiment, the pair of opposed inner sidewalls 24 extend along the entire length, and in other embodiments substantially the entire length, of the cargo area 22. The second inner sidewall portion 32 and pocket channel 38 may extend along all, or any portion, or spaced apart portions, of the lengths of the opposed inner sidewalls 24. In one embodiment, the second inner sidewall portions 32 and pocket channels 38 extend along the entire lengths of either or both of the opposed inner sidewalls 24. In another embodiment, at least one of the second inner sidewall portions 32 extend along only a portion the length of the opposed inner sidewalls 24, such as, for example, where the pocket second inner sidewall portion 32 and pocket channel 38 do not extend along the length proximate a fuel filler tube (not shown) that extends inwardly from a fuel filler door 39, but does extend along the remainder of the length of inner sidewall 24 as shown in FIG. 3.

The lower end 34 includes a pocket channel 38 defined in the second inner sidewall portion 32. The pocket channel 38 is configured to receive the first end 66 of an elongated member 40. Any suitable elongated member 40 may be inserted into the pocket channel 38 including various tools 42, such as various rakes, shovels, forks, hoes, saws, and other tools having elongated handles; elongated materials, such as pipes, tubes, or dimensional lumber; or various equipment having an elongated member or handle. The inner sidewall 44 may be made from any suitable material, including any suitable metal, engineering plastic, or combination or composite thereof. Suitable metals include sheet forms of various steel and aluminum alloys. Suitable engineering plastics include various engineering thermoplastic or thermoset polymer compositions, or combinations or composites thereof, and particularly may comprise various sheet molding compound (SMC) compositions which are ready to mold glass-fiber reinforced polymer resin (e.g. polyester) composite materials primarily used in compression molding or forming operations. In one embodiment, an SMC comprises a plurality of long strands (e.g. >1") of a chopped fiber (e.g. glass fibers or carbon fibers) dispersed in a polymer resin of an engineering plastic (e.g. a polyester, vinyl ester or epoxy resin), which may include a thermoplastic or thermoset resin, or a combination or copolymer thereof.

Advantageously, the design and configuration of the deck 18, and in particular the second inner sidewall portion 32 and/or pocket channel 38, is very flexible as shown for example in FIGS. 1, 1A, and 3. In certain embodiments, the characteristics, including the size and shape, of the second inner sidewall portion 32 and/or pocket channel 38 can vary along the length of the cargo area 22. For example, in one embodiment of the truck 10 and rear compartment 14, the deck 18 includes a pocket channel 38 that has a pocket channel height or depth ($h_p$) from a channel base 43 to a top edge 45 of an outermost channel wall 47 that varies along the length of the cargo area 22.

As also shown in FIGS. 1A and 3, in one embodiment, the rear compartment 14 and deck 18 may also advantageously include as an integral part of either or both of inner sidewalls 24 at least one lateral sidewall rib 49, and more preferably a plurality of lateral sidewall ribs 49, extending between the first inner sidewall portion 28 and the second inner sidewall portion 32. The sidewall rib or ribs 49 may have any suitable size, shape, and longitudinal thickness, and in the case of a plurality of ribs may be spaced apart with any suitable predetermined spacing. The sidewall rib or ribs 49 serve as structural strengthening and stiffening members of inner sidewalls 24, and are particularly useful to support the weight of the elongated members 40, such as tools 42, while maintaining structural rigidity of the sidewalls. This reduces or limits or prevents flexure of the sidewalls 24 and the pocket channels 38 during operation and movement of the truck 10 whereby the rear compartment 14 is subject to various accelerations and decelerations and associated forces, and thus reduces or limits or prevents the tendency of the elongated members 40, such as tools 42, to move upwardly and downwardly or inwardly or outwardly in response to these forces. The sidewall rib or ribs 49 also strengthen the inner sidewalls 24 by distributing the operating loads from elongated members 40 within the sidewalls and reducing stresses at locations that would otherwise experience higher stresses, such as, for example, top portion 30.

As also shown in FIGS. 1A and 3, in one embodiment, the rear compartment 14 and deck 18 may also advantageously include as an integral part of either or both of inner sidewalls 24 at least one lateral pocket channel rib 51, and more preferably a plurality of lateral pocket channel ribs 51, disposed within the pocket channel 38 and extending between the second inner sidewall portion 32 that also forms the innermost channel wall and the outermost channel wall 47. The pocket channel ribs 51 also serve as structural strengthening and stiffening members of inner sidewalls 24, particularly the pocket channel 38. The pocket channel rib or ribs 51 are also particularly useful to support the weight of the elongated members 40, such as tools 42, while maintaining structural rigidity of the pocket channel 38. The pocket channel rib or ribs 51 also reduces or limits or prevents flexure of the sidewalls 24 and the pocket channels 38 during operation of the truck and thus also reduces or limits or prevents the tendency of the elongated members 40, such as tools 42, to move upwardly and downwardly or inwardly or outwardly during operation of the truck 10. The pocket channel rib or ribs 51 also strengthen the inner sidewalls 24 by distributing the operating loads from the elongated members 40 that are stored or disposed within the deck rail storage apparatus 1 within the inner sidewalls and reducing stresses at locations that would otherwise experience higher stresses, such as, for example, the channel base 43 and outermost channel wall 47. The pocket channel rib or ribs 51 also advantageously divide the pocket channel 38 into a plurality of discrete pockets 37 that are configured to receive the first ends 66 of the elongated members 40, and allows adjacent first ends 66 to be stored in separate pockets 37 as shown in FIG. 3. This advantageously limits or prevents the first ends 66 from sliding longitudinally down the pocket channels 38 when the truck 10 is in motion and the first ends are subject to longitudinal forces resulting from the acceleration and deceleration of the truck.

As shown in FIGS. 1, 1A, and 3, in one embodiment the deck rail storage apparatus 1 also includes a pair of opposed, longitudinally extending, outer sidewalls 44 that extend along the length of the cargo area 22. Each of the outer sidewalls 44 includes a top portion 46 and outer sidewall portion 48 that extends downwardly from the top portion of the outer sidewall. The outer sidewall 44 may have any suitable size and shape and thickness. In one embodiment, the outer sidewalls 44 comprise the rear quarter panels of the truck 10 and define the rear wheel wells 50 that are configured to receive the rear wheels 52. The outer sidewall 44 may be made from any suitable material, including any suitable metal, engineering plastic, or a combination or composite thereof. Suitable metals include sheet forms of various steel and aluminum alloys. Suitable engineering plastics include various engineering thermoplastic or thermoset polymer compositions, or combinations or composites thereof.

In one embodiment, deck rail storage apparatus 1 also includes a pair of opposed, longitudinally extending, deck rails 54 disposed on the top portion of the outer sidewalls 44, each deck rail comprising at least one deck rail opening 56, and in certain embodiments a plurality of openings 56 that are longitudinally spaced apart along the length of the deck rail 54 and cargo area 22. The outer sidewalls 44 will also each include an opening or openings through the top portion 46 that correspond in size, shape, and longitudinal location with the deck rail openings 56. The deck rails 54 may have any suitable size and shape and thickness, including the size and shape shown in FIG. 1A wherein the deck rail includes a base 58, first side 60, and second side 62 and generally covers the top portion 46 of the outer sidewall 44. In certain embodiments, the first side 60, second side 62, or both, may extend downwardly to cover a downwardly extending inner lip portion 64 of the outer sidewall 44 and/or the outer sidewall portion 48, respectively. In one embodiment as shown in FIGS. 1 and 1A, the truck 10 includes a deck rail 54 where the openings are disposed above the channel pocket 38 and are configured to receive an elongated member 40, such as a tool or elongated component or material 42 having a first end 66 and a second end 68, wherein the first end is configured for insertion downwardly through the opening into the channel pocket so that it rests in and engages the channel pocket, and wherein the second end is disposed inwardly of the deck rail over the cargo area. The angle ($\alpha$) may be selected together with the height ($h_a$) of the second inner sidewall portion 32 to position the channel pocket 38 and the deck rail openings 56 so that the second ends 68 of the elongated members 40 inserted into the channel pocket are disposed inwardly of the deck rail 50 over the cargo area 18. This combination of the angle ($\alpha$)

and height ($h_a$) is very advantageous because it safely positions the elongated members 40, such as tools 42, within a vertical space envelope defined by the outer periphery of the truck 10, and particularly the rear compartment 14, and prevents interference or collision of the elongated members, such as tools, with other vehicles, buildings, or other objects that are located outside the vehicle, particularly while the vehicle is in motion. In one embodiment, the height ($h_s$) may be constant along the length of the sidewalls 24 and cargo portion 22. In another embodiment, as shown in FIG. 3, the height ($h_s$) varies along the length of the sidewalls 24 and cargo portion 22. Varying the height ($h_s$) along the length of the sidewalls 24 is advantageous because it allows storage to be provided along the entire length (1), or substantially the entire length, of sidewalls 24, including over the wheel wells 50, which provide more storage capacity for elongated members. This also advantageously provides storage for elongated members having different lengths, such as, for example, those elongated members 40 that are relatively shorter stored in locations having relatively smaller heights ($h_s$) and those elongated members that are relatively longer stored in locations having relatively greater heights.

Referring to FIG. 2, in one embodiment, the truck 10 rear compartment 14 and deck rail 54 also includes as a deck rail assembly 70 at least one deck rail opening cover 72, or a plurality of covers 72, configured with a size and shape that correspond to, and are configured to selectively and releasably cover and uncover, the deck rail opening 56 or openings 56, such as by the incorporation of one or more attachment mechanisms to secure the covers within the openings. In one embodiment, each cover 72 includes a peripheral seal 74 that seals the corresponding opening and prevents ingress of liquid water, snow, ice, dust, dirt, stones, and other external environmental contaminants. In one embodiment, the plurality of deck rail opening covers 72 have a plurality of different sizes and/or shapes. In one embodiment, the deck rail assembly 70 also includes a tether 76, or plurality of tethers 76, corresponding to the covers or covers 72, each having a first end 78 and a second end 80, the first end of the tether disposed on the opening cover and configured to tether the opening cover to the rear compartment 14 and the second end disposed on one of the deck 18, the outer sidewall 44, or the deck rail 54. In one embodiment, the second ends 80 of the tethers 76 are disposed on one of the deck 18, the outer sidewall 44, or the deck rail 54 by a corresponding plurality of tether attachment points 82. In one embodiment, the tether attachment points 82 include a corresponding plurality of slots 92 that are configured to selectively and releasably capture the second ends 80 of the tethers 76, such as barbed ends.

Figure 4:
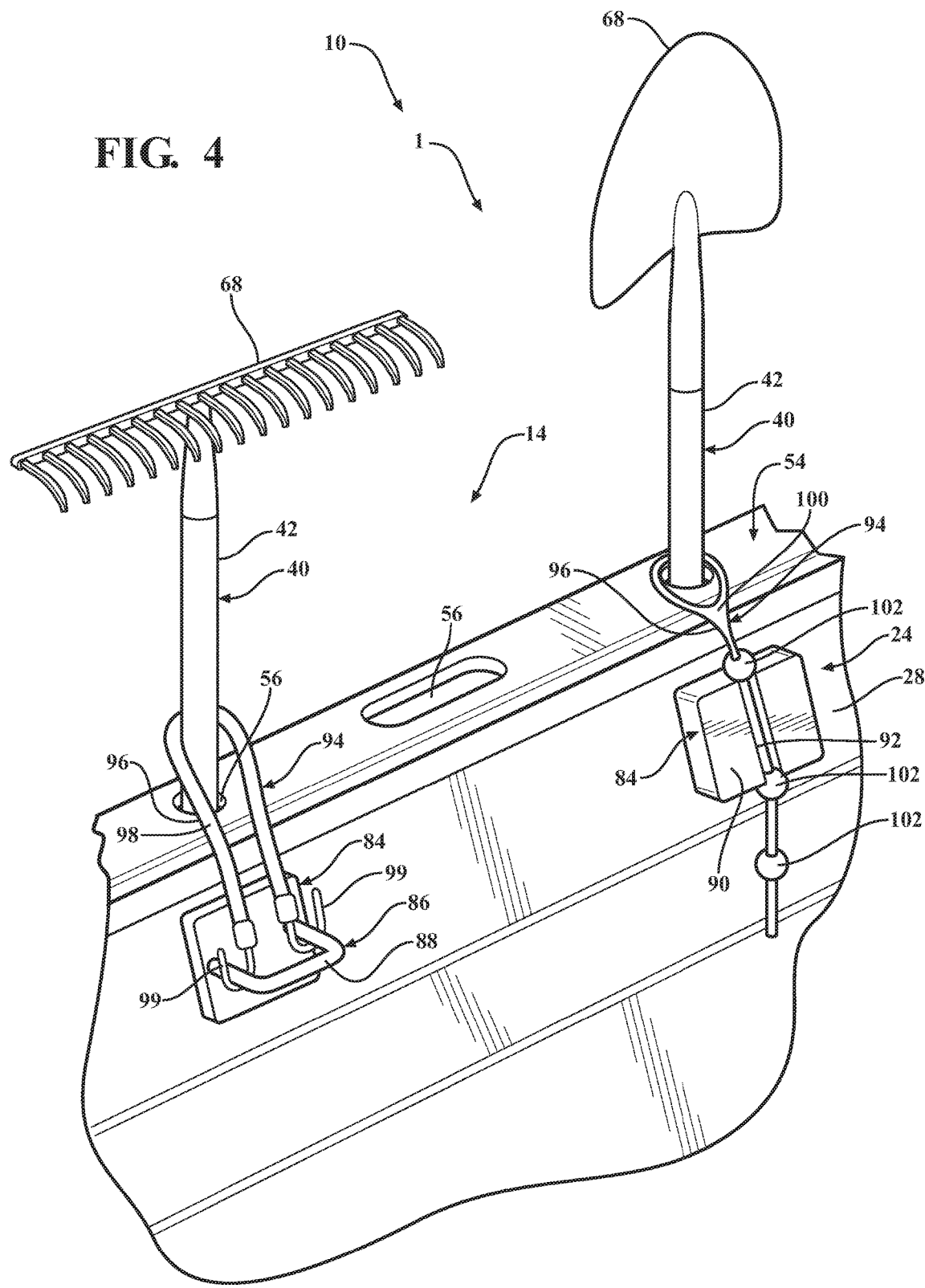
FIG. 4 is a perspective view of a portion of the truck deck rail tool storage apparatus and truck of FIG. 3 that includes embodiments of tool tethers as disclosed herein.

As illustrated in FIG. 4, in one embodiment, rear compartment 14 and rear deck rail storage apparatus 1 also includes plurality of attachment points 84 disposed on or within the first inner sidewall portions 28 of inner sidewalls 24. In one embodiment, an attachment point 84 includes a longitudinally or vertically extending member 86, such as a handle 88. In another embodiment, the attachment point 84 includes a plate 90 that includes a slot 92. In one embodiment, the attachment points 84 are configured for use with a plurality of tool tethers 94 that are configured for selectively attachable and releasable engagement with the attachment points 84. In one embodiment, the tool tether 94 comprises an elastic member 96, such as a bungee cord 98 having hook ends 99 that are configured to have the cord stretched and the hooked ends 99 attached to the longitudinally or vertically extending members 86. In another embodiment, the elastic member 96 comprises an elastic rubber band 100 having a plurality of integral bulbous features 102. The bulbous features 102 are configured to have the cord stretched and placed within the slot 92 with adjacent bulbous features 102 engaging the opposed sides of the plate 90 to fix the cord within the slot. The tool tethers 94 are configured to be elastically stretched and attached to the attachment points 84 to provide a clamping force that clamps the elongated members 40, such as tools 42, components or materials, into the deck rail storage apparatus 1 in the rear compartment 14 to prevent the elongated members 40 stored therein from being dislodged or ejected from the truck 10 as the vehicle is in motion over a roadway and the wheels and vehicle suspension proximate the rear compartment 14 actuate in response to bumps in the roadway resulting in upward and downward acceleration of the rear compartment 14 and elongated members 40.

The deck rail 54 and deck rail assembly 70, as well as deck rail openings 56 and deck rail opening covers 72, are different than and specifically distinguished from, existing deck rails having a plurality of stake pockets or channels and associated stake channel openings and/or stake channel opening covers that are associated with the stake pockets or channels, which are commonly found in many pickup trucks. When used, stake channels are frequently disposed in the corners of the box (e.g. 4 stake channels), or in the corners and at a midpoint or intermediate location, such as over the wheel well (e.g. 6 stake channels). Stake channels are metal three-sided or four-sided vertical channel structures, generally rectangular or square in cross section, that are fixed to the box, such as by being welded to the respective outer sidewalls. They are designed and constructed to orient members (e.g. stakes) inserted therein vertically. Stake channels and their associated stake channel openings do not and would not provide for storage of elongated members inserted therein at an angle from the vertical so that the free end of the member is disposed inwardly toward or over the cargo area as is the case with the present invention. Stake channels were originally incorporated to receive wooden stakes, which were sometimes used for the attachment of horizontal boards or sheets to extend the sidewalls of the truck bed, and have also been used to house the vertically oriented members of insertable metal frame structures that are inserted therein. Due to their vertical structure, stake channels and stake channel openings would always orient tools, materials, or components inserted therein in a vertical orientation in contrast to the deck rail storage apparatus 1 of the present invention. The deck rail tool storage apparatus 1 is not a stake rail channel or apparatus and the stake rail openings are not the deck rail openings 56 disclosed herein.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A truck rear compartment, comprising:
   a deck, comprising:
      a floor that defines a cargo area having a length and width; and
      a pair of opposed inner sidewalls that extend along the length of the cargo area comprising a first inner sidewall portion that extends upwardly away from the floor to a top portion and a second inner sidewall portion that extends downwardly from the top portion to a lower end, the lower end comprising a pocket channel.

2. The truck rear compartment of claim 1, wherein the second inner sidewall portion extends downwardly at an angle away from a vertical axis.

3. The truck rear compartment of claim 2, wherein the angle is between 2 and 25 degrees.

4. The truck rear compartment of claim 1, wherein the pair of opposed inner sidewalls extend along substantially the entire length of the cargo area.

5. The truck rear compartment of claim 1, wherein the deck comprises an engineering plastic or a metal, or a composite thereof.

6. The truck rear compartment of claim 5, wherein the engineering plastic comprises a sheet molded composite and the metal comprises steel or aluminum.

7. The truck rear compartment of claim 1, wherein the pocket channel has a height from a base to a top edge of an outermost channel wall, and wherein the height of the pocket channel varies along the length of the cargo area.

8. The truck rear compartment of claim 1, further comprising a plurality of lateral sidewall ribs extending between the inner sidewall portion and the outer sidewall portion.

9. The truck rear compartment of claim 1, further comprising a plurality of lateral pocket channel ribs disposed within the pocket channel.

10. The truck rear compartment of claim 1, wherein the second inner sidewall portion has a height from the top portion of the inner sidewall to the bottom end, and wherein the height varies along the length of the cargo portion.

11. The truck rear compartment of claim 1, further comprising:
    a pair of opposed outer sidewalls that extend along the length of the cargo area, each of the outer sidewalls comprising a top portion and outer sidewall portion that extends downwardly from the top portion of the outer sidewall; and
    a pair of opposed deck rails disposed on the top portion of the outer sidewalls, each deck rail comprising an opening.

12. The truck rear compartment of claim 11, further comprising a plurality of opening covers configured to selectively and releasably cover and uncover the openings.

13. The truck rear compartment of claim 12, wherein the plurality of openings and plurality of opening covers have at least one of a plurality of different sizes and a plurality of different shapes.

14. The truck rear compartment of claim 12, further comprising a plurality of cover tethers having a first end and a second end, the first end of the cover tethers disposed on the opening cover and configured to tether the opening covers to the rear compartment.

15. The truck rear compartment of claim 14, wherein the second end of the tethers are disposed on one of the deck, the outer sidewall, or the deck rail.

16. The truck rear compartment of claim 1, further comprising a plurality of attachment points disposed on or in the first inner sidewall portion.

17. The truck rear compartment of claim 16, further comprising a plurality of tool tethers that are configured for selectively attachable and releasable engagement with the attachment points.

18. A truck, comprising:
    an enclosed passenger compartment; and
    a rear compartment, the rear compartment comprising:
       a floor that defines a cargo area having a length and width; and
       a pair of opposed inner sidewalls that extend along the length of the cargo area comprising a first inner sidewall portion that extends upwardly away from the floor to a top portion and a second inner sidewall portion that extends downwardly from the top portion to a lower end, the lower end comprising a pocket channel, wherein the second inner sidewall portion extends downwardly at an angle away from a vertical axis;
       a pair of opposed outer sidewalls that extend along the length of the cargo area, each of the outer sidewalls comprising a top portion and outer sidewall portion that extends downwardly from the top portion of the outer sidewall; and
       a pair of opposed deck rails disposed on the top portion of the outer sidewalls, each deck rail comprising a deck rail opening.

19. The truck of claim 18, wherein the deck rail opening is disposed above the channel pocket and is configured to receive an elongated member having a first end and a second end, wherein the first end is configured for insertion downwardly through the deck rail opening into the channel pocket, and wherein the second end is disposed inwardly of the deck rail over the cargo area.

\* \* \* \* \*